(12) United States Patent
Dandl (10) Patent No.: US 10,183,474 B2
(45) Date of Patent: Jan. 22, 2019

(54) METHOD FOR PROVIDING A LAMINATION FILM WITH ADHESIVE, METHOD FOR APPLYING HOT MELT, APPLICATION, LAMINATION PLANT AND METHOD FOR UPGRADING SUCH A PLANT

(71) Applicant: KIEFEL GmbH, Freilassing (DE)

(72) Inventor: Andreas Dandl, Laufen (DE)

(73) Assignee: KIEFEL GmbH, Freilassing (DE)

( * ) Notice: Subject to any disclaimer, the term of this patent is extended or adjusted under 35 U.S.C. 154(b) by 665 days.

(21) Appl. No.: 14/631,225

(22) Filed: Feb. 25, 2015

(65) Prior Publication Data

US 2015/0239224 A1 Aug. 27, 2015

(30) Foreign Application Priority Data

Feb. 26, 2014 (DE) .................. 10 2014 002 568

(51) Int. Cl.
*B60R 13/02* (2006.01)
*B32B 37/12* (2006.01)
(Continued)

(52) U.S. Cl.
CPC ...... *B32B 37/1292* (2013.01); *B29C 63/0047* (2013.01); *B32B 37/003* (2013.01);
(Continued)

(58) Field of Classification Search
CPC ..... B32B 37/1292; B32B 7/14; B32B 37/003; B32B 2605/003; C09J 2201/28;
(Continued)

(56) References Cited

U.S. PATENT DOCUMENTS 4,822,663 A * 4/1989 Reott ................. B32B 7/14
428/159
5,650,215 A * 7/1997 Mazurek ............ B29C 43/222
428/156
(Continued)

FOREIGN PATENT DOCUMENTS

DE 103 23 617 A1 12/2004
EP 1 508 579 A1 2/2005
(Continued)

OTHER PUBLICATIONS

European Search Report dated Sep. 17, 2015 in European Application No. 15 00 0483 with English translation of the relevant parts.
(Continued)

*Primary Examiner* — Carson Gross
(74) *Attorney, Agent, or Firm* — Collard & Roe, P.C.

(57) ABSTRACT

A method for providing a laminate film with adhesive as a step in the preparatory process for manufacturing a laminate mold part using a support part, a method for applying a hot melt to a laminate film, a method for manufacturing a laminate mold part, using a method, a system for laminating a support part as well as a method for such a system produces especially high quality lamination and even if the support part, where the laminate film should be laminated, is not porous by applying the adhesive to the support part for bonding the macroscopically structured laminate film, so that there is a duct system. The air can flow through the duct system between the laminate film and the support part during the lamination process.

20 Claims, 4 Drawing Sheets

(51) Int. Cl.
  *B32B 37/00* (2006.01)
  *B29C 63/00* (2006.01)
  *C09J 7/20* (2018.01)
  *B32B 7/14* (2006.01)
  *B32B 37/10* (2006.01)
  *B32B 38/06* (2006.01)

(52) U.S. Cl.
  CPC . *C09J 7/20* (2018.01); *B32B 7/14* (2013.01); *B32B 37/0053* (2013.01); *B32B 37/1009* (2013.01); *B32B 37/1207* (2013.01); *B32B 38/06* (2013.01); *B32B 2037/1215* (2013.01); *B32B 2307/7242* (2013.01); *B32B 2307/734* (2013.01); *B32B 2309/02* (2013.01); *B32B 2309/68* (2013.01); *B32B 2398/20* (2013.01); *B32B 2605/003* (2013.01); *B60R 13/02* (2013.01); *B60R 13/0256* (2013.01); *B60R 13/0262* (2013.01); *C09J 2201/28* (2013.01); *Y10T 29/49716* (2015.01); *Y10T 156/1744* (2015.01)

(58) Field of Classification Search
  CPC . B60R 13/02; B60R 13/0237; B60R 13/0243; B60R 13/025; B60R 13/0256; B60R 13/0262
  USPC .......................................... 156/291, 87, 286
  See application file for complete search history.

(56) References Cited

U.S. PATENT DOCUMENTS

| | | | |
|---|---|---|---|
| 5,902,439 A * | 5/1999 | Pike | G09F 3/02 156/252 |
| 2005/0043455 A1 | 2/2005 | Hohner | |
| 2006/0235134 A1 | 10/2006 | Bach et al. | |
| 2008/0196822 A1* | 8/2008 | Satoh | B32B 37/003 156/219 |
| 2011/0229694 A1 | 9/2011 | Kanda | |

FOREIGN PATENT DOCUMENTS

| | | |
|---|---|---|
| EP | 1 511 578 B1 | 11/2008 |
| FR | 2 873 382 A1 | 1/2006 |
| WO | 00/69985 A1 | 11/2000 |

OTHER PUBLICATIONS

DIN 53 735, Bestimmung des Schmelzindex von Thermoplasten, Testing of plastics: determination of the melt flow index of thermoplastics, Jan. 1983, pp. 1-6.

* cited by examiner

METHOD FOR PROVIDING A LAMINATION FILM WITH ADHESIVE, METHOD FOR APPLYING HOT MELT, APPLICATION, LAMINATION PLANT AND METHOD FOR UPGRADING SUCH A PLANT

CROSS REFERENCE TO RELATED APPLICATIONS

Applicant claims priority under 35 U.S.C. § 119 of German Application No. 10 2014 002 568.6 filed Feb. 26, 2014, the disclosure of which is incorporated by reference.

BACKGROUND OF THE INVENTION

1. Field of the Invention

The present invention relates to a method for providing a lamination film with adhesive, a method for applying hot melt to a lamination film, the application for such a method, a plant for laminating a carrier member with a lamination film, as well as a method for upgrading a plant.

In particular, the invention relates to a method for laminating components with film, whereby an adhesive is so applied in grid pattern to the surface of the lamination film and/or the component, and that, after assembling the film and the component, the adhesive is arranged between the film and the component, and a channel system formed between the areas of applied adhesive to enable the uniform removal of the air lying between the component and the film (removal of the air by extraction and/or pressing out).

Furthermore, the invention relates to a laminated mold part that is obtained through the above-mentioned method, as well as the use of an adhesive grid pattern that is arranged between a component and a lamination film in order to reduce or avoid entrapping air during lamination of the component with the lamination film.

2. Description of the Related Art

The lamination of components by applying a negative pressure or vacuum, such as vacuum lamination or variants such as the in-mold graining (IMG) process and/or by means of pressing power, is widely used in industry.

In vacuum-assisted lamination methods, generally an airtight or partially air-permeable material (e.g. a decorative film) is laminated on a solid component. The adhesive used can be applied as a pre-coating on the film or the component.

In this process, the film can be heated and then applied to the component by applying a negative pressure. The heat energy required for the film forming can also be used for activation of the adhesive. A distinctive condition for the process is the air permeability (vacuum capability) of the substrate (component) to be laminated in combination with an airtight film. The latter can be achieved for example through an additional membrane.

While the vacuum capability is usually obtained by the use of porous materials such as wood-based materials or open-pore composite materials, in the case of airtight component materials, such as are typically produced by injection molding or partially air permeable component materials, such as, for example, in the case of fiber composites, special precautions need to be taken. These usually include the introduction of vacuum holes and the application of a lamination graining on the component, which allows extraction of the air contained between the film and component. The lamination graining gives rise to grain channels in the component through which the air located between the component and the film can be extracted.

The vacuum holes permit the extraction of the air between the film and the component by applying a negative pressure or vacuum. However, this is often not sufficient to avoid small to medium sized air pockets occurring. This may be caused, for example, by the geometry of the components, but also by the deposition process of the film and the limited capacity of the vacuum holes. Therefore, in the prior art, lamination graining is usually also applied to the component, which also allows further air extraction through the channels of the grain to the holes following the "first contact" of the film with the component. However, the application of this lamination graining to the component is technically complex and costly, especially since a sufficient grain typically requires a depth of 0.2 to 0.3 mm, which leads to a correspondingly higher use of material and also increases the overall weight of the component. This can represent up to 10 wt.-% of the component weight.

In the automotive sector, particularly for components in the interior of vehicles, i.e. typically two different processes are used in practice for the film lamination in the preferred application.

In a first method, the adhesive is applied by spraying it onto the component. In this case, a varnish-like adhesive application must be avoided as this can lead to the clogging of the vacuum holes by the adhesive (e.g. when using a dispersion or solvent adhesive).

In an alternative method, the adhesive is applied to the film (e.g. a hot melt substance). In this case, the hot melt adhesive is heated and activated with the film up to the typical required film deforming temperature (depending on the film: 120° C. to 210° C.).

In the latter process, the adhesive is a viscous liquid (usually a reactive or thermoplastic melt adhesive). This is the case even in the vacuum joining process. The viscous adhesive can easily clog the vacuum holes or grain channels because of its fluidity. This prevents the uniform extraction of the air and can thus favour the formation of air pockets. This results in visible but also invisible defects in the finished laminated molding.

In fact, the expert is aware that these kinds of defects caused by air pockets, often occur when using hot melt adhesives; the demands on grain quality, and the requirements with respect to the quality and depth of the grain as well as the number of holes are higher than in the case of the first-mentioned process, where the adhesive is sprayed on the component.

SUMMARY OF THE INVENTION

The object of the present invention is to provide an alternative to the prior art or to offer improvements.

According to a first aspect of the present invention, the object is achieved by a method for providing a lamination film with adhesive as a preliminary step in order to produce a laminated molded part by means of a carrier member, the lamination film and the adhesive, whereby the adhesive should bond the B side of the lamination film and a surface of the carrier member, through the steps (a) application of the adhesive to the B side; and (b) subsequent shaping of the adhesive by imprinting a grid pattern in the adhesive, so that channels are formed with the grid before the adhesive is bonded to the surface of the carrier member.

Conceptually, this may be explained as follows:

The "lamination film" may be a plastic film, preferably a plastic film based on polyvinylchloride (PVC), polyolefins, thermoplastic polyolefins (TPO), polycarbonate, polyethers, polyesters, polyurethanes, polymethacrylates, or combinations of copolymers and terpolymers thereof. But other (decorative) materials are suitable, such as foam films, textiles, metal films, real leather, artificial leather and layered composites of several of the above materials. In this case, air tightness can achieved through the use of additional membranes.

The lamination film preferably has a thickness in the range of 0.1 mm or more and 7.0 mm or less, preferably 1.0 mm or more and 3.5 mm or less, more preferably 1.5 mm or more and 2.5 mm or less.

In particular, the plastic films include films based on polyolefins such as polypropylene and polyethylene. In addition, films based on polyester, polyamide, polycarbonate, polyvinyl chloride, polymethyl methacrylate and polystyrene are preferred. By polyolefins such as polyethylene and polypropylene, is not only to be understood ethylene and propylene homopolymers but also copolymers with other olefins such as acrylic acid or 1-olefin. Thus, by polyethylenes is to be understood in particular ethylene copolymers with 0.1 to less than 50 wt.-% of one or more olefins such as propylene, 1-butene, 1-pentene, 1-hexene, 1-octene, 1-decene or 1-dodecene, with propylene, 1-butene and 1-hexene being preferred. By polypropylenes is to be understood in particular propylene copolymers with from 0.1 to under 50 wt.-% ethylene and/or one or more 1-olefins such as 1-butene, 1-pentene, 1-hexene, 1-octene, 1-decene or 1-dodecene, whereby ethylene, 1-butene and 1-hexene are preferred. By polypropylene is preferably to be understood substantially isotactic polypropylene.

Polyethylene films may be made from HDPE or LDPE or LLDPE.

Under polyamide films, those derived from nylon 6 are preferred.

Under polyester films, those of polybutylene terephthalate and especially polyethylene terephthalate (PET) are preferred.

Under polycarbonate films, those derived from polycarbonates and produced using bisphenol A are preferred.

Under films made of polyvinyl chloride is to be understood those made of rigid polyvinyl chloride or plasticized polyvinyl chloride, whereby soft polyvinyl chloride also includes copolymers of vinyl chloride with vinyl acetate and/or acrylates.

Plastic films according to the present invention may also include composite films; for example, films comprising one of the above-mentioned films, and a metal film or fiber films.

A solvent-free melt adhesive is preferably used as the "adhesive". This covers water and solvent-free adhesives that are solid, in particular, at room temperature (21° C.+/−1° C.), and which are applied to the materials to be bonded from the melt and that, after assembly, physically and/or chemically set on cooling.

However, there are also suitable pressure-sensitive adhesives, dispersion adhesives, solvent adhesives, for example, based on polyurethane, polyacrylate, ethylene vinyl acetate (EVA), polyvinyl acetate (PVAc), styrene-isoprene-styrene copolymer (SIS), styrene-butadiene-styrene copolymer (SBS), or chloroprene rubber (CR). Suitable melt adhesives, depending on the requirements, may in particular be melt adhesives in thermoplastic or reactive qualities.

The hot melt adhesives used are selected in particular as a function of the materials to be bonded and the related specific requirements, such as the required temperature or heat resistance of the bond, etc.

Suitable thermoplastic hot melt adhesives may include those in particular based on ethylene vinyl acetates (EVA), polyolefins (e.g. amorphous poly-alpha-olefins or metallocene-catalytically produced polyolefins), polyacrylates, co-polyamides, co-polyesters and/or thermoplastic polyurethanes, while corresponding copolymers and/or terpolymers may be used. Metallocene-catalytically produced polyolefins are particularly preferred, as they have an increased freedom from tackiness.

As regards reactive melt adhesives, for example moisture-curing, such as those based on silane-grafted amorphous poly-alpha-olefins, silane-grafted metallocene-catalytically prepared polyolefins (see EP 1508579 A1) or isocyanate-terminated polyurethanes are used. In the case of reactive hot melt adhesives, the subsequent crosslinking with moisture leads to temperature or heat-resistant adhesive bonding. Reactive hot melt adhesives thus combine the advantages of rapid initial strength through the physical setting process of cooling with a subsequently occurring chemical crosslinking. The melt must be protected from moisture before its application in the processing of moisture reactive hot melt adhesives.

Polymers that are suitable for the purposes of the present invention include reactive moisture-curing hot melt adhesives that are commercially available as silane-modified poly alpha-olefins, for example, under the product designation "Vestoplast® 206" from Degussa AG, Marl, Germany. According to the invention, particularly preferred are silane-modified poly-alpha-olefins, with average molecular weights Mn from 5,000 to 25,000 g/mol, preferably 10,000 to 20,000 g/mol.

As described below in more detail, reactive hot melt adhesive additives on the basis of non-reactive polymers resins and/or waxes may be added to control the open time and or the adhesion properties: also optionally hydrogenated rosin ester and aliphatic hydrocarbon resins.

The application of the adhesive to the surface of the film and/or the component, preferably exclusively on the surface of the film, is carried out, as described above, in the temperature range of 90° C. or more and 220° C. or less, preferably 120° C. or more and 190° C. or less.

In order to achieve good coatability of the hot-melt adhesive, hot melt adhesives are commonly used that, at processing temperatures of generally 90° C. to 200° C., have Brookfield viscosities in the range of generally 50 to 1,000,000 mPa·s.

For example, preferably in accordance with the invention, reactive hot melt adhesives based on silane-grafted polyolefins, especially silane-grafted poly-alpha-olefins, are used, which at 180° C. have Brookfield viscosities in the region of 50 to 50,000 mPa·s, especially from 1,000 to 10,000 mPa·s, preferably 5,000 to 8,000 mPa·s, more preferably 5,500-7,500 mPa·s.

To control the reactivity and the crosslinking behaviour, all the common catalysts can usually be added to the reactive hot melt adhesives, e.g. dibutyltin dilaurate (DBTL), and in the usual quantities for this purpose. Examples of catalysts suitable for the present invention include the most common and well-known adhesive chemical catalysts, such as organic compounds, such as the aforementioned dibutyltin dilaurate (DBTL) or alkyl mercaptide compounds of dibutyltin, or organic iron, lead, cobalt, bismuth, antimony and zinc compounds, as well as mixtures of the aforementioned compounds or amine-based catalysts such as tertiary amines, 1,4-diazabicyclo[2.2.2]octane and dimorpholinodiethyl ether and also mixtures thereof. According to the invention, dibutyltin dilaurate (DBTL) is particularly preferred, especially in combination with adhesives based on the aforementioned reactive, preferably silane-modified poly-alpha-olefins. The amounts of catalyst(s) employed may vary widely; most preferably, the amount of catalyst used is from 0.01 to 5 wt.-%, with respect to the adhesive. In order to control the application properties of the adhesives, further additives may also be added, such as plasticizers, high-boiling organic oils or esters or other additives serving for plasticizing, stabilizers, antioxidants, acid scavengers, fillers, anti-aging agents and the like.

To control the open time and/or adhesion properties of the above-mentioned adhesives, especially with respect to improved handling, other additives on the basis of non-reactive polymers, resins and/or waxes may also be added to the aforementioned hot melt adhesives. In this way, the adhesive properties may be adapted to the application—tailor-made in a manner of speaking.

As regards non-reactive polymers, they may for example be selected from the group consisting of (i) ethylene vinyl acetate copolymers or terpolymers, especially those with vinyl acetate contents between 12 and 40 wt.-%, more preferably 18 to 28 wt. %, and/or with melt indices (MFIs, DIN 53735) from 8 to 800, preferably 150 to 500; (ii) polyolefins, such as unmodified amorphous poly-alpha-olefins, in particular having average molecular weights Mn from 5,000 to 25,000 g/mol, preferably 10,000 to 20,000 g/mol, and/or with softening ranges using the ring and ball method between 80° C. and 170° C., preferably between 80° C. and 130° C., or unmodified metallocene-catalytically produced polyolefins (see DE 103 23 617 A1.); and (iii) methacrylates such as styrene methacrylates and also mixtures of these compounds.

As regards non-reactive resins, these may in particular be selected from the group consisting of hydrocarbon resins, especially aliphatic, cyclic or cycloaliphatic hydrocarbon resins, modified or unmodified rosin resins (e.g. rosin resin esters), terpene-phenolic resins, cumarone indene resins, methyl styrene resins, polymerized tall resin esters and/or ketone aldehyde resins.

As regards non-reactive waxes, polyolefin waxes such as polyethylene and polypropylene waxes or waxes modified on this basis may be used.

Preferably, the "carrier member" to be laminated for the "laminated molded part" to be produced, is made of a material selected from among materials on the basis of natural fiber reinforced polymer materials, for example a natural fiber, such as a flax-polypropylene material, natural fiber, for example, a pure flax or a natural fiber, for example flax epoxide resin material, as well as a carrier member made of polypropylene (PP), styrene-isoprene-styrene co-polymer (ABS), polycarbonate ABS (PCABS), polycarbonate (PC), thermoplastic polyurethane (TPU), thermoplastic polyolefin (TPO) or polyamide produced by means of an injection molding process.

Particularly preferred are materials produced through plastic injection molding from acrylonitrile butadiene styrene (ABS), polycarbonate ABS (PCABS), polypropylene (PP), polycarbonate (PC), thermoplastic polyolefin (TPO), fiber composites comprising natural fiber PP, glass fibers, carbon fibers, synthetic fibers, mineral fillers, binding agents PP, polyurethane resin, phenolic resin, or combinations thereof.

The components may have a grain. Preferred, however, are components with no grain or a grain unsuitable for the extraction of air (this is, for example, the case with a grain that is too flat).

Furthermore, the components are preferably rigid and/or airtight or partially permeable to air and/or vacuum permeable.

In the context of the present invention, various lamination tests were performed on smooth, un-grained components using a TPO foam sheet that is commonly used in the automotive sector, whereby various component geometries, adhesive gravure (on the TPO film), lamination parameters and as well as various numbers and types of holes and hole locations in the component were tested. The component material and the adhesive were so selected that the adhesive had only limited adhesion to the components in order to facilitate the removal of the laminated film and thus permit an accurate evaluation of the bonded joint. The analysis of the components laminated according to the invention showed perfect bonding without any air pockets.

In fact, the channels resulting from the gravure coating were still recognisable in the laminated molded part. In this way, for example, it was possible to avoid the dreaded incomplete or slowed cross-linking of the adhesive in areas without air contact in the case of humidity cross-linked reactive adhesives.

In general, the inventive method is carried out in such a way that the joining together of the lamination film and the component after application of the lamination film and/or the component is effected with the adhesive by applying a negative pressure (or a vacuum) and/or by means of pressure. The bonding by means of pressure is effected, for example, by pressing the film onto the component or by pressing the component into the film, whereby the film receives a hard or elastic impression, whose shape reflects the construction of the component in the film.

The adhesive is preferably on a surface of the lamination film that will face the laminated substrate in the following step. The lamination film coated with the grid-like adhesive may be placed on the component immediately and subsequently laminated or, alternatively, stored and used later for the lamination. In the latter case, the film pre-coated with adhesive is then preferably stable when stored. This also means that it is not prevented from being in the form of rolled goods when being stored or transported, and that it retains the properties of the gravure during storage and transport.

The bonding by means of vacuum is usually carried out by applying a vacuum via the edge of the component or via openings arranged in the component, through which a vacuum can be created (so-called vacuum holes). The number of vacuum holes is adapted to the size and geometry of the component and the adhesive gravure/adhesive application used. Preferably, at least one vacuum hole is located in the component. In further embodiments according to the invention, two, three, four or even more openings are arranged in the base part (i.e. in the substrate or carrier member).

Preferably, the bonding of the lamination film and the component is carried out under heating, in particular above the melting or softening range of the adhesive.

According to a particularly preferred embodiment, a suitable hot melt adhesive with a grid pattern is first applied to the lamination film and assembled together with the component to be laminated. In this case, the hot melt adhesive is usually heated above its melting or softening temperature before and/or during the assembly of the lamination film and the component, so that a secure adhesive bond is ensured between the lamination film and the component.

To ensure a secure bond between the lamination film on the one hand and the component on the other, in conjunction with good processing properties, such as optical properties, etc., the adhesive is preferably used or applied in an amount of 10 g/m2 or more and 200 g/m2 or less, preferably 50 g/m2 or more and 100 g/m2 or less.

After application, the adhesive covers preferably 40% or more and 99% or less of the total surface area of the film and/or of the component, preferably the film provided with the adhesive grid, particularly preferably 60% or more and 90% or less, most preferably 70% or more and 85% or less.

The application of the adhesive can be carried out under heating, typically by melting at temperatures in the range of 40° C. or more and 220° C. or less, especially 120° C. or more and 190° C. or less.

In a preferred embodiment of the method according to the invention, this is effected by heating the lamination film coated with the adhesive before and/or during the bonding with the component. Alternatively, the component can be heated.

The "B side" is the side of the lamination film that should face the carrier member.

However, the decisive inventive concept of the first aspect of the present invention is the sequence of the three steps taken together: First, the adhesive must be applied to the B side of the film. Then, in a separate step the already-applied adhesive, i.e. in the direction of passage through the machine, directly or indirectly, is then reshaped and a macroscopic structure applied, i.e. a "grid"; then the bonding between the lamination film and the carrier member is effected only via the already-shaped adhesive.

While in the not yet published European patent application 14164625.7, the application of the adhesive is effected directly with a macroscopic structure with the difference here in that the structure is not achieved in one step, but only in (at least) two steps, i.e. the application and then the shaping of the structure.

The method presented here offers the advantage of enabling existing plant components to be used in an appropriate embodiment, i.e. for example, an existing device for applying adhesive in a conventional manner.

Only through the additional shaping step can be created in the plastic and/or in the adhesive, the complicated geometries that can serve as channels during the lamination process.

An existing plant can thus be upgraded cost-effectively to offer high quality work.

It should be expressly understood that within the scope of the present patent application, the indefinite articles and numerical data such as "one", "two", etc. should generally be understood to be minimum figures, i.e. as "at least one . . . " "at least two . . . " and so on, insofar as it is not possible for a person skilled in the art, indirectly or technically, to infer from the relevant context that this should or could mean "exactly one . . . ", "exactly two . . . " etc.

According to a second aspect of the present invention, the object is achieved by a method for providing a lamination adhesive as a preliminary step in the method for producing a laminated molded part by means of a carrier member, the lamination film and the adhesive, whereby the adhesive should bond the B side of the lamination film and a surface of the carrier member, by means of the steps of (a) introduction of recesses in the B side of the lamination film, and (b) introduction of the adhesive into and/or between the recesses, whereby the order of these two steps may also be reversed.

Conceptually, this may be explained by the fact that a "recess" is singular, especially a number of single troughs or channels, whereby the recess is measured on the surface on the B side of the lamination film. In particular, the surface on the B side of the lamination film can be used as a reference value, in fact in the feed to the station or the tool for introducing the recesses. Thus, it is conceivable that the film on the B side is smooth and the tool for introducing the recesses is fed. On introducing the recesses, a plurality of troughs or channels are then pressed into the B side, either through direct contact-type mechanical loading or the application of high or low pressure.

On one hand it can be advantageous to introduce the adhesive into the recess. This means that the lamination film with the adhesive contained in the recesses could be easily transported further without the risk of an excess of adhesive being squeezed sideways or similar non-foreseeable rearrangements of the adhesive. On the other hand, the argument in favour of the introduction of the adhesive between the recesses means that in most cases it will be easier and can even be carried out using conventional tools. For example, one could use a conventional slot die, which according to the prior art would apply a completely flat smooth adhesive to a lamination film. Such a slot die is easily adjustable due to the previous experience of the operator so that the lamination film passing in the machine direction can be provided with adhesive in the plane of its passing surface. In such a case, a recess would either remain free of adhesive or at least would receive less adhesive. A reversal of the steps is also conceivable, so that the adhesive is applied first and then only after that are the recesses produced in the lamination film. The application of the adhesive may thus already take place in macro-structured channels, or a redistribution of the adhesive may be carried out on production of the recesses.

According to a third aspect of the present invention, the object is achieved by a method for providing a lamination film with adhesive as a preliminary step in the method for the production of a laminated molded part by means of a carrier member, the lamination film and the adhesive, whereby the adhesive is bonds the B side of the lamination film and a surface of the carrier member through the following steps of (a) application of the adhesive through a slot die, (b) whereby the output of the adhesive through the slot die may be hindered by local resistances at the outlet in order to thereby form a grid.

This aspect of the invention is to be understood as follows: at least substantially uniform pressure is present at the side of the slot die for the discharge of the adhesive. Normally, the slot die has the same slot width over the entire length of the slot. Thus adhesive is discharged at the same speed and therefore with the same throughput at any point of the slot die, and then affixed to the lamination film.

However, this presupposes that the discharge flow of the adhesive over the entire width of the slot die is opposed by a uniform resistance.

However, if the resistance across the width of the slot die is changed locally, then the volume flow of the discharged adhesive also changes.

For example, if the lamination film is transported more closely locally to the slot die or transported further away from it, and/or if the surface of the B side of the lamination film has a different surface tension across the width of the slot die and/or if, for example, a grid, a rod, a flap or another discharge cross-section modifier is moved locally in front of the slot die, and then moved away again, then all this leads to a grid-shaped application of adhesive on the lamination film.

According to a fourth aspect of the present invention, the object is achieved by a method for applying a hot melt to a lamination film and then laminating the latter onto a carrier member, whereby the hot melt is applied in a structured manner.

By the grid-shaped application of adhesive (gravure application) according to the present invention is to be understood in the present disclosure that a structured adhesive is provided primarily on one surface, to give channels or a channel system that are/is preferably contiguous between the individual adhesive applications. The adhesive is preferably applied in the form of dots and/or strips at pre-determined intervals (i.e. in a certain grid). The channels (or channel system) so formed between the adhesive applications enable, after the assembly of the lamination film and the component, optimized suction or pressing out of any air present between the film and component. The suction of air takes place typically via the edge of the component or by applying a negative pressure/vacuum via vacuum holes arranged in the component. In particular, the continuous channels (channel system) allow a uniform escape of the air by suction and/or pressing out over the entire surface of the film-covered component, whereby this happens largely independently of the geometry of the component (for example, any existing radii). In addition, in the case of film lamination by application of pressure, the grid-shaped adhesive application forming the channel system is equally advantageous because the air present between the component and the film can be squeezed out uniformly over the entire surface of the component.

Surprisingly, it has also been found that the grid-shaped channel-forming structure of the adhesive application during the lamination process is sufficiently retained, and no melting away of the adhesive takes place. The type of adhesive used here is not particularly limited, so basically all lamination adhesives commonly used for film lamination may be used. Please refer to the relevant prior art in this respect.

In addition, when using moisture-curing adhesives, the grid-shaped adhesive application allows sufficient contact with the surrounding air via the channels and thus the air humidity. Incomplete curing of the adhesive and thus the formation of voids without bonding is thereby avoided.

The grid-like application of adhesives, especially of hot melt adhesives, is known to the person skilled in the art. Typically, however, the grid-like application is only for the sake of reducing the amount of adhesive used, better anchoring of the adhesive in open substrates, such as foams, preparation of breathable laminates, e.g. for the lamination of breathable membranes in which a closed adhesive film is undesirable. However, the selective use of negative or positive pressure in the lamination process, especially for the reduction and prevention of air pockets, is unknown.

By the purposeful use of a specific gravure, whereby the adhesive is applied in a grid-shaped manner, areas are formed, especially linear areas with no (or significantly less) adhesive (so-called channels) that are retained sufficiently long in the lamination process so that a complete and extensive, i.e. even, removal of the air present between the film and the substrate is made possible through suction and/or pressing out the air.

Preferably, the channels retain their shape until the end of the lamination process and are thus also retained especially in the finished laminated molded part.

In principle, the geometry of the gravure or the grid is subject to no restrictions, insofar as it is ensured that sufficient channels are formed to enable the removal of the air by suction and/or pressing out, or access to sufficient air in the case of moisture-reactive adhesives (and thus the access of moisture to the adhesive).

Preferably, the adhesive is applied in the form of dots or strips, particularly preferably in the form of a truncated pyramid, polygon (for example, three-, four-, five-, six-, seven-, eight-, nine- or ten cornered), diamond-shaped, rectangular, oval, L-shaped, round or irregularly shaped adhesive applications, particularly in the form of a truncated pyramid adhesive application.

Furthermore, gravures may also be used that are sufficiently known to the person skilled in the art from the standard grain gravures of the component.

The adhesive applications (especially the truncated pyramidal adhesive applications) are preferably applied at a distance (measured on the substrate surface) of 0.1 mm or more and 10.0 mm or less, preferably 0.3 mm or more and 5.0 mm or less, more preferably 0.5 mm or more and 4.0 mm or less, most preferably 1.0 mm or more and 3.5 mm or less, particularly 1.5 mm or more and 2.5 mm or less.

The depth of the gravure, i.e. the thickness (height measured from the respective substrate surface) of the applied adhesive, is preferably in the range of 0.1 mm or more and 1.5 mm or less, particularly preferably 0.2 mm or more and 1.0 mm or less, most preferably 0.5 mm or more and 0.8 mm or less.

The adhesive dots are preferably applied in an irregular arrangement or in different areas of different, preferably irregular, arrangements, i.e. without the formation of longer linear channels. The formation of a secondary structure (i.e. a Structure that is recognisable only by a certain regular arrangement of applied adhesive) is thus avoided, with the result that the appearance of the finished laminated component gives the impression of a particularly smooth surface. Of course, adhesive applied regularly in the form of geometric patterns, whose combinations or combinations thereof with irregularly applied adhesive, are also possible. In addition, the application of the adhesive may be adapted to the shape and/or the surface of the molded part.

In particular components without any grain (or those with flat, typically unsuitable grain or a smooth surface) as well as components with few holes can be laminated by means of the channels shaped/formed by the adhesive grid. This results in a significantly reduced number of defects. In the preferred ideal case, the final product has no discernible defects.

If the adhesive is melted (e.g. when using hot melt adhesives), this does not spread flatly but forms individual drops in the presence of a suitable gravure, whereby the channels are preserved between the drops. These channels then allow uniform air transportation in the area between the component and the lamination film and thus the desired horizontal vacuum access (horizontal air transportation, i.e. removal of the air) within the adhesive grid.

Preferably, the hot melt is applied to form structured channel elevations, to form channels between the elevations through which air can be drawn along the film surface, whereby a diamond pattern is preferably produced.

In principle, however, the invention can work with either a positive application or a negative application of adhesive, i.e. either with application of the adhesive as a macro-structural elevation with the channels being formed between the plurality of macro-structural elevations; or as channels formed through reshaping to produce the channels.

According to a fifth aspect of the present invention, the object is achieved by a process especially involving a method as described above to produce a laminated molded part by means of a carrier member, a lamination film and an adhesive, especially a hot melt, whereby the adhesive bonds a B side of the lamination film and a surface of the carrier member through the following steps of (a) grid-shaped application of adhesive to the B side of the lamination film and/or to the surface of the carrier member, whereby channels are formed by the grid-like application of the adhesive, either already on the first application or after re-shaping; (b) assembly of the carrier member and the lamination film so that the layer of the applied grid-shaped adhesive is arranged between the lamination film and the carrier member; and (c) bonding of the lamination film to the carrier member by (i) removal of the air present between the carrier member and the lamination film via the channels by applying a negative pressure and/or by (ii) pressing out the air present between the carrier member and the lamination film via the channels by applying positive pressure, whereby the method is characterized in that the lamination film is drawn off a roll as an endless film and/or that the adhesive is applied to a roller during the unrolling of the lamination film and/or that the adhesive is applied to the lamination film by means of a slot die and/or that the adhesive is applied inside a recess.

Five independent aspects of the invention are explained in detail above.

It should be clearly noted that the five above-described independent aspects of the invention may be combined in any arrangement of the second, third, fourth or fifth aspects.

The same applies explicitly to all the features in connection with one of the independent aspects that has been described above or that will be described below. All of these may also be applied to any other aspect of this invention.

For a constructive embodiment, it is proposed that the lamination film should be guided around an embossing roller, whereby the surface of the embossing roller has structured protrusions and is thus able to emboss a channel pattern.

The feeding of the lamination film via rollers is useful because in most existing plants, there are already roller assemblies for feeding the lamination film web. In a rolling line, the lamination film web is guided under traction force to the rollers. If a roller has textured protrusions on its surface (referred to herein as an "embossing roller"), then the traction force may be applied in such a way, especially in combination with the heating of the embossing roller and/or the lamination film web, that the application of a structure is already possible in this way. Thus, for example the embossing roller may press channel-shaped gaps into a previously applied full-surface adhesive film; or the embossing roller may press recesses into the lamination film, especially before charging with adhesive.

Thus, it is entirely conceivable that the lamination film may be guided around an embossing roller, whereby the surface of the embossing roller has textured elevations enabling the impression of a plurality of recesses in the lamination film, either as a plurality of discrete unconnected recesses, or as a plurality of recesses connected in a channel system.

In the implementation of a method according to the invention, the lamination film may be led around a pressure roller, in particular after being led around an embossing roller, and guided past a slot die during its passage around the pressure roller.

While the lamination film web is passing around a roller, its location may be pre-determined with very high accuracy. This makes it possible to set a slot die at an exactly predictable distance from the lamination film web. This enables the precise selection of both an introduction of the adhesive into recesses while simultaneously avoiding the non-recessed areas, or, alternatively, providing adhesive at least in the substantially full area of the non-recessed surfaces, while simultaneously avoiding the recessed areas.

It is also possible to use a conventional slot die, whereby only the distance from the passing lamination film web is set. Either a further roller is used in the existing rolling line, i.e. the embossing roller, or a roller is exchanged.

It is also conceivable that the adhesive is introduced into the macroscopic recesses in the lamination film, preferably flush with the surface and bonded with the B side of the lamination film, or via a flat application of the adhesive above the recesses.

A method which particularly exploits the properties of suitable plastics with memory effect, arranges that recesses are first formed in the lamination film, and then filled with adhesive and then the recesses are flattened so that the adhesive rises from the recesses to form a grid-like structure.

To flatten the recesses, the lamination film is preferably actively heated, especially by means of irradiation through heat lamps directed at the lamination film.

Irradiation through heat of suitable plastic materials with memory effect enables recovery of the original cast and stretched shape. So if, initially, recesses are introduced in the lamination film web by an embossing roller in a heated condition, for example by means of a directly-heated embossing roller, then a return of the recesses to the flat or at least flatter film web may be easily achieved by exposure to heat.

The recesses in the lamination film may be flattened from the outside via the memory effect in plastic without mechanical action. Alternatively, the recesses in the lamination film may be flattened by mechanical action on the A side.

In some circumstances, it may be desirable by means of an embossing roller, especially a grain roller, to provide an extended surface of a panel with a surface structure while avoiding a recess area, and later providing the panel with adhesive, whilst avoiding the recess area, i.e. by means of a designated waste area and/or in designated cut-off area and/or in a lamination film for a door panel.

Such features are especially of great advantage if the method is used in a method for manufacturing a laminated molded part.

The particularly desired suitability of a method as described above is found in the manufacturing of a interior trim part of a motor vehicle. According to a seventh aspect of the present invention, the object is achieved by a plant for laminating a carrier member with a lamination film, as well as with a station for applying adhesive to hold the lamination film on the carrier member, whereby the plant to implement the method is set up as described above.

By "station" is to be understood a tool that is adapted for applying the adhesive, whereby this station may be made of conventional components such as a slot die for applying adhesive to a lamination film web in a roller line.

In a preferred embodiment of the invention, there is first a stamping station for the lamination film, and only later, indirectly or directly, the station for applying adhesive arranged in a machine direction, i.e. in the designated flow direction of the lamination film through the plant.

This is particularly advantageous because the application of the adhesive on the lamination film may be effected mechanically from the already embossed surface of the lamination film on its B side. Thus, it is conceivable to use the embossed B side of the lamination film for the local alteration of the discharge resistance of a known slot die, so that the embossed surface on the B side of the lamination film provides a macroscopic structured grid-shaped adhesive application on the lamination film. In this way, the embossed recesses and the intervening non-recessed areas may result in either a later positive or negative adhesive, and thus channel, formation.

If the embossing station has a deflection roller with a grid-shaped structured surface, then the embossing may be simply impressed into the surface of the B side of the lamination film and/or the adhesive in the roller line without tension.

The "grid-like structured surface" should be considered—exactly as in the case of the embossed lamination film—as a structure that leads to macroscopic embossing. Tolerated microscopic structuring as a result of technical production reasons or for reasons of economy should not be understood in this sense. Rather, the structure must have a channel structure of such a size, i.e. in width and depth, that the channels obtained in the manner described previously may use negative or positive pressure for the conduction of air both on the embossing roller as well as in lamination film and/or at least in the adhesive.

In order to use as little force as possible in the embossing, it is proposed that the embossing station has a temperature roller.

A roller is then "tempered" when it preferably has a control for increasing the temperature relative to the ambient air. In particular, one should consider electrical contact heating, laser beam heating, or other radiant heating. The heater should preferably be arranged inside the roller so that the surface of the roller, i.e. that portion which comes into contact with the revolving lamination film, may be heated without having to influence the web run.

Due to the tempering, it is possible with the appropriate setting of the plant to introduce embossing in the lamination film, which leads to the recovery of the form of the lamination film through the memory effect of a plastic on re-tempering, whereby the recovery of the form of the plastic may be used for rearrangement and structuring of the adhesive.

The station for the application of the adhesive may have a slot die with an adhesive discharge.

In particular, one thinks of a station well-known from the prior art for applying adhesive, whereby a slot die in the designated transport path of the lamination film may be precisely set so that the slot die is arranged to apply a uniform adhesive coating on the passing film.

By means of a modification of the film path and/or the slot die, the functionality required here for the locally changing adhesive application may be obtained.

It should be expressly understood that the application of adhesive and/or a shaping of the adhesive does not necessarily have to take place in a rotary tool and thus on the revolving film. Rather, it may also be effected for a stationary application and/or shaping, or a corresponding tool may be moved along with the film.

In the case of a slot die, preferably a distance setting is provided between an outlet of the slot die and a designated path of the lamination film.

This makes it possible to vary easily the amount of discharged adhesive. If the distance is greater, then a greater amount of adhesive is discharged; however, if the distance is smaller, then a reduced amount of adhesive will be discharged. If the distance is zero or almost zero, then only a very thin film of adhesive or not even a continuous film of adhesive will be discharged onto the areas facing the passing film at the slot die when blocked.

Regardless of this, the interplay between the outlet pressure of the adhesive and the distance between the die and the lamination film may be used to provide recessed areas or at least substantially non-recessed areas surface flatly with adhesive in such a way that the adhesive does not enter at all, or at least does not substantially enter the recessed areas.

Such a coating of the lamination film with adhesive has been found to be particularly easy to adjust in recent prototype tests of the inventor. The discharge of the adhesive from the nozzle may preferably be without pressure.

It is proposed that a recess flattening station is arranged after the station for applying adhesive and prior to the station for applying the adhesive-coated lamination film to the carrier member.

The recess flattening station should be arranged to flatten recesses in the lamination film, i.e. either to eliminate them completely or at least partly, but mainly to eliminate them. In a simple case, by means of mechanical action from the A side or B side of the lamination film, a recovery of the embossed recesses may be supported, for example by suction out of the recessed surface of the B side, or by means of a pressurized air effect against the recessed points from the A side.

If there is sufficient heat on the B side of the lamination film during the impressing of the macroscopic structure, recesses may be introduced so that the depth of the recesses on the B side is less than any elevation on the A side.

Preferably, however, the introduction of recesses on the B side is so performed that no elevations arise on the A-side. To achieve this, for example, the recess impressing tool my be opposed by a supporting device, for example, a smooth-faced pressure roller.

According to a further aspect of the invention, the object is achieved by a method for converting a plant with a slot die for applying adhesive to a moving lamination film to produce a laminated molded part through the following steps of: insertion of a device to produce a grid-shaped structural pattern on a B side of the lamination film, i.e. on the path from the introduction of the lamination film towards the slot die.

It is to be understood that an existing plant may be easily converted using the invention presented here: the existing rolling line may also be further used with an existing slot die for applying adhesive. It only requires that somewhere in the plant, following the feeding of the lamination film into the plant and before the application of the adhesive, but also after the application of the adhesive, the means for production of the grid-shaped structure on the lamination film is installed, for example, by replacing an existing component such as primarily a guide roller.

The present invention relates to the following points according to further aspects that may occur alternatively or cumulatively in this description, and/or alternatively or cumulatively in the patent claims of this patent application:

1. A process for preparing a laminated molded part of a component (alternatively also referred to as a substrate) and a lamination film (alternatively referred to as a film) which is characterized in that it comprises the following steps:
   grid-shaped application of an adhesive to the surface of the lamination film and/or component, whereby channels are formed by the grid-shaped application of the adhesive to the surface,
   assembly of the component and the lamination film so that the layer of grid-shaped adhesive is applied between the lamination film and the component, and
   bonding of the lamination film to the component by (a) removal of the air present between the component and the film via the channels by applying a negative pressure or (b) pressing out of the air present between the component and the film via the channels by applying a positive pressing, or (c) a combination of (a) and (b).

2. A method according to point 1, characterized in that the bonding of the lamination film with the component is effected by removal of the air present between the component and the film via the channels by applying a negative pressure.

3. A method according to any one of the points 1 or 2, characterized in that at least one vacuum hole is arranged in the component and via which the negative pressure is applied.

4. A method including one or more of points 1 to 3, characterized in that the adhesive is applied in punctiform or strip form 15, preferably in a truncated pyramid, polygonal, rhombic, rectangular, oval, L-shaped, round, or irregularly shaped adhesive form, most preferably a truncated pyramid or truncated conical adhesive form.

5. A method including one or more of points 1 to 4, characterized in that the ducts between the areas/locations of the adhesive application remain free of adhesive while applying the grid-shaped form.

6. A method including one or more of points 1 to 5, characterized in that the ducts are retained until the end of the lamination process.

7. A method including one or more of points 1 to 6, characterized in that the adhesive is applied in an irregular layout or areas of irregular layout.

8. A method including one or more of points 1 to 7, characterized in that the adhesive is placed at a distance of 0.1 mm or more and 10.0 mm or less, preferably 0.3 mm or more and 5.0 mm or less and, more preferably, 0.5 mm or more and 4.0 mm or less, most preferably, 1.0 mm or more and 3.5 mm or less, particularly 1.5 mm or more and 2.5 mm or less.

9. A method including one or more of points 1 to 8, characterized in that the adhesive is a reactive or non-reactive 10 thermoplastic hot-melt adhesive, preferably a hot-melt adhesive based on ethylene vinyl acetates, polyacrylates, copolyamides, copolyesters, copolyethers, polyolefins, polyurethanes, and the relevant copolymers and/or terpolymers.

10. A method including one or more of points 1 to 9, characterized in that the adhesive is a latently reactive, dual- or multicomponent system in which the reaction components are applied as a unified mixture or as grid points next to each other or above each other.

11. A method including one or more of points 1 to 10, characterized in that the lamination film is a plastic film, preferably a plastic film based on polyvinylchloride (PVC), polyolefins, thermoplastic polyolefins (TPO), polycarbonate, polyethers, polyesters, polyurethanes, poly(meth)acrylate, or with the same combinations, copolymers or terpolymers.

12. A method including one or more of points 1 to 11, characterized in that the lamination film has a thickness in the range of 0.1 mm or more and 7.0 mm or less, preferably 1.0 mm or more and 3.5 mm or less, more preferably 1.5 mm or more and 2.5 mm or less.

13. A method including one or more of points 1 to 12, characterized in that the component is limited by an airtight material or is made of a ventilating material.

14. A method including one or more of points 1 to 13, characterized in that the component retains its shape.

15. A method including one or more of points 1 to 14, Characterized in that the component is made of a material, which is selected from plastic-injection molded acrylonite butadienestyrene (ABS), polycarbonate ABS (PCABS), polypropylene (PP), polycarbonate (PC), thermoplastic polyolefin (TPO), fibrous compound materials made of natural fiber PP, glass fibers, carbon fibers, synthetic fibers, mineral fillers, PP binding material, polyurethane resin, phenolic resin, or combinations thereof.

16. A method including one or more of points 1 to 15, characterized in that the component does not have a lamination stain.

17. A method including one or more of points 1 to 16, characterized in that the adhesive-coated lamination film is heated with the component before and/or during bonding.

18. A method including one or more of points 1 to 17, characterized in that the laminate mold is a vehicle interior panel or part of a vehicle interior panel.

19. A laminate mold part, particularly a vehicle interior panel or part of a vehicle interior panel, produced by a process including one or more of the previous points.

20. The use of a grid layout between a component and a laminate adhesive to reduce or prevent air pockets in the lamination of the component with the laminate film.

21. Usage in accordance with point 20, characterized in that
the adhesive is applied in grid form on the surface of the laminate film and/or the component, which is formed by the application of the adhesive in a grid form on the surface of the ducts,
the component and the laminate film are bonded so that the layer of adhesive is applied in a grid form between the laminate film and the component, and
the laminate film is bonded (laminated) with the component by removing (a) whereby, between the component and film, air is found in the ducts by applying reduced pressure or by pressing (b) whereby, between the component and film, air is found in the ducts by applying bonding pressure, or (c), a combination of
(a) and (b).

22. The use of any one of points 20 or 21, characterized in that the adhesive is puncti-form or strip form applied to the laminate film, preferably in rectangular, polygonal, rhombic, round, or irregularly-shaped adhesive form, most preferably in a truncated pyramid or truncated conical adhesive form.

23. The use of one or more of points 20 to 22, characterized in that the laminate includes a vacuum laminate, an in-mold graining (IMG) method, a press laminate or hybrids thereof.

24. The use of the laminate mold in accordance with point 19 as a vehicle interior panel or as part of a vehicle interior panel.

In addition to the method and usage aspects as described above, the present invention also extends to a laminated mold part, namely a vehicle interior panel or part of a vehicle interior panel, which can be achieved using the inventive method.

Moreover, the present invention also provides the use of an arranged adhesive grid between a component and a laminate film to reduce or avoid air pockets during the component lamination with the laminate film.

The laminate is preferably made up of a vacuum laminate, an in-mold-graining (IMG) method, a press lamination, or hybrids thereof.

BRIEF DESCRIPTION OF THE DRAWINGS

The invention is explained below with various design examples with reference to the accompanying drawings, in which can be seen

DETAILED DESCRIPTION OF PREFERRED EMBODIMENTS

Figure 1:
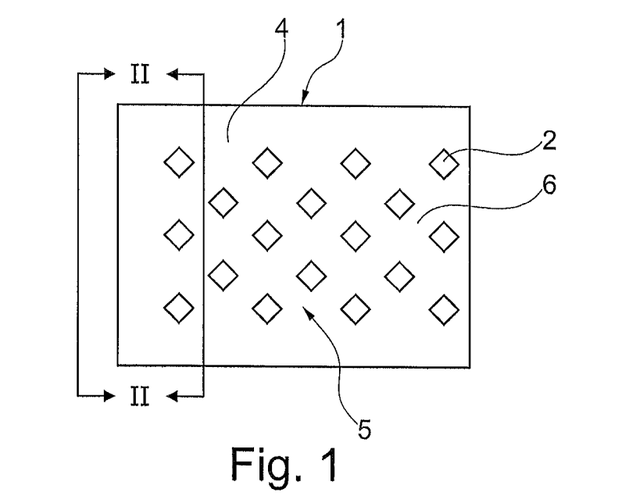
FIG. 1 shows schematically, a plan view of a film having a pattern-applied hot melt.

The laminate film 1 in FIG. 1 is made up of a substantially two-dimensional art material film, which is meant to dress an interior panel part on the body of a motor vehicle and to be laminated on a support part with the B-side in FIG. 1 visible.

In preparing the compound, a hot melt is applied to laminate film 1, and in a variety of rhombuses 2 (labeled). Each rhombus 2 has a height of 3, with which it rises above a surface 4 on the B-side 5 of the laminate film 1.

In between the rhombus 2, a system of ducts is generated that are fully linked with each other.

Figure 3:
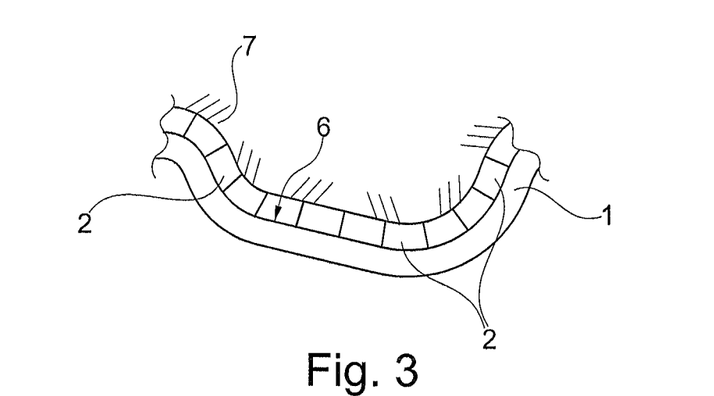
FIG. 3 shows an analog section on FIG. 2, but on a support part in a tool.

Laminate film 1 is now laminated in a mold on support part 7 (see FIG. 3), thus keeping height 3 of rhombuses 2 upright from the hot melt of the open linked feature of duct system 6. The air in the tool can be removed laterally. It flows through the free cross-section of the duct system 6. Here, laminate film 1 moves even closer step by step to support part 7 until a direct positive fit lock finally occurs when the air is sucked out of duct system 6.

Figure 4:
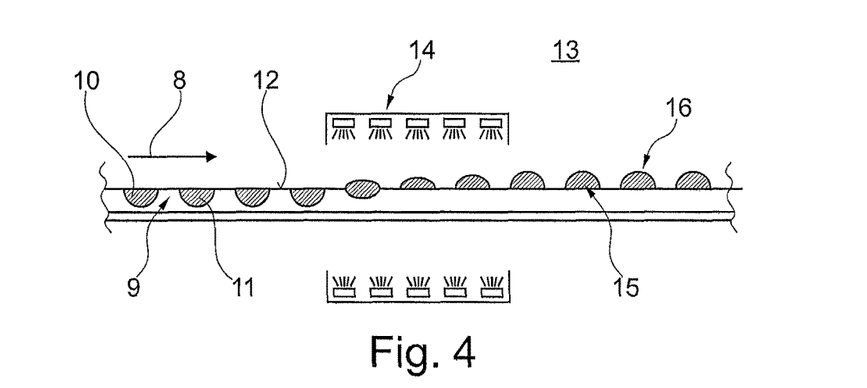
FIG. 4 shows a schematic of longitudinal section using a laminate film in a station for leveling indentations in the laminate film.

A previously described embodiment of the invention provides for the event that indentations are incorporated in the laminate film, whereby adhesive is placed into the indentations, and then in a further step, the indentations of the laminate film are flattened, so that the adhesive reaches the surface of the laminate film. An example of this is shown in FIG. 4:

A laminate film 9 tapering in machine direction 8 has embossed macroscopic grooves 10 (exemplarily characterized) that are filled with an adhesive 11 (exemplarily labeled).

Every groove 10 receives a drop of adhesive 11.

On a surface 12 towards a B-side. 13, the adhesive 11 is made to be flat and flush with the surface 12 between the ducts 10.

The laminate film 9 is guided in machine direction 8 through a station with two radiant heaters 14 (exemplarily labeled), which leads to the heating of laminate film 9.

A memory effect in the plastic of the laminate film 9 results in the grooves 10 receding in the areas of the radiant heaters 10 and 14 and becoming flat with surface 12 of laminate film 9. Here, it contrasts in the memory effect, restoring the synthetic material of the laminate film 9 to the adhesive 11, so that the adhesive ultimately projects from the grooves 10 in droplets 15 from the film surface and forms an open, linked duct system 16 (exemplarily labeled) between the droplets 15.

In other forms, the film is heated prior to thermoforming. By heating it, the film can be stamped and the grooves can be refilled with adhesive. The film is smooth again. The adhesive, which was in the grooves, is applied to the inflated structure on the film.

Figure 5:
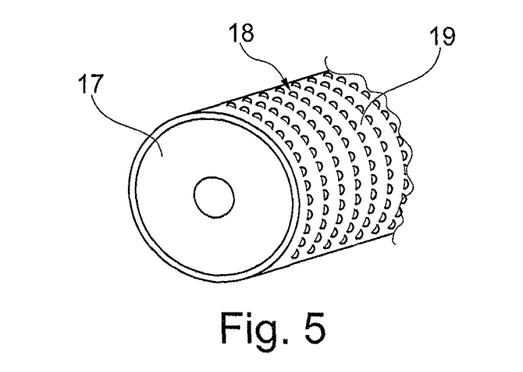
FIG. 5 shows a schematic of perspective view of an embossing roller for implementing the invention.
Figure 6:
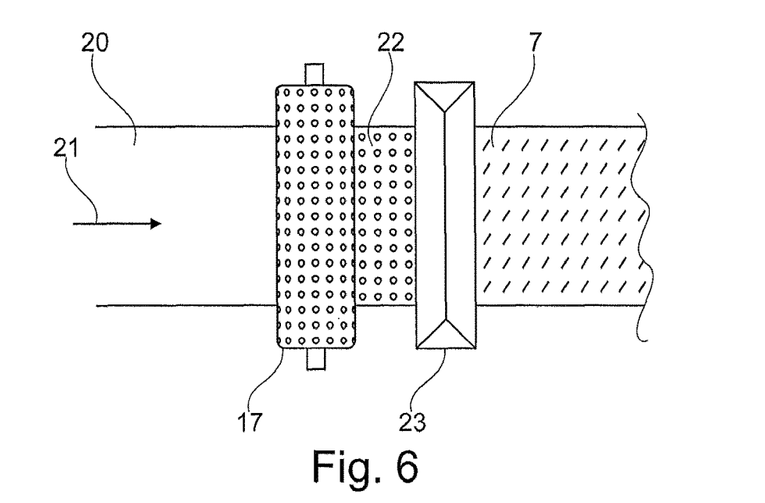
FIG. 6 shows a schematic of plan view of a rolling mill using the roller from FIG. 5.

Embossing roll 17 in FIGS. 5 and 6 essentially consists of a conventional deflection roller, whereby on a lateral surface 18, a variety of macroscopically structured bumps 19 is arranged (exemplarily labeled). For example, each elevation 19 forms a partially spherical body.

Figure 7:
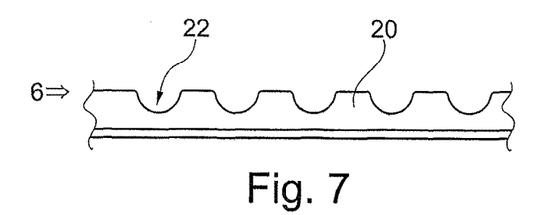
FIG. 7 shows a schematic of longitudinal section view of a film with embossed grooves.
Figure 8:
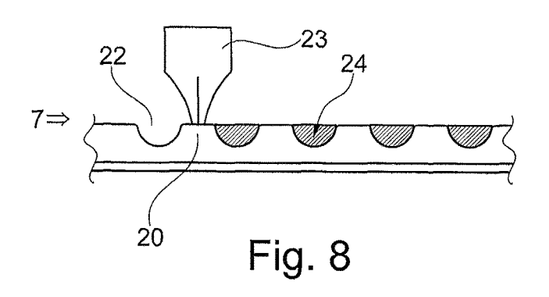
FIG. 8 shows an analog schematic of sectional view as in FIG. 6, showing the grooves filled with adhesive.

Run a laminate film 20 through the system in a machine direction 21, so that it passes around to the embossing roller 17 and where it holds a number of grooves 22 (exemplarily labeled) (cf. also FIGS. 7 and 8).

Subsequently, the laminate film 20 is provided with grooves 22 from a slot die 23 with minimal spacing running along it. The hot glue comes from the slot die 23 throughout the process. As a result, the surface of the laminate film 20 immediately strips along between grooves 22, and ideally does not contact them. Adhesive 24 only, or at least mainly passes into the grooves 22.

Figure 9:
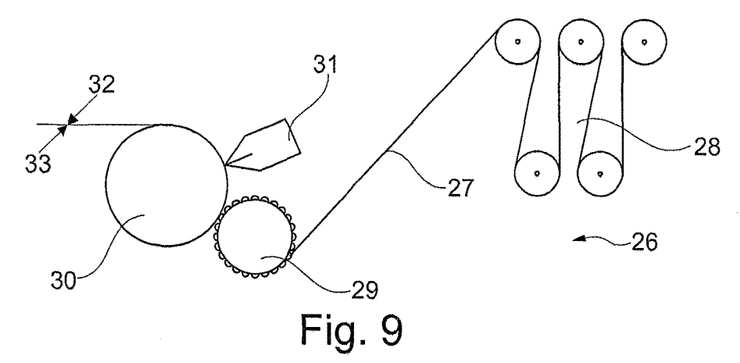
FIG. 9 shows a schematic of lateral view of a rolling mill.

A possible roller route 25 for a system to laminate from support parts with laminate films is shown in FIG. 9: The laminate film 27 runs in a machine direction 26, firstly into a film storage 28 with floating rollers. After the film storage 28, the laminate film 27 runs along and to a tempered embossing roll 29 of about 180° C. The embossing roller 29 runs the laminate film 27 in the machine direction directly to a pressure roller 30, which has a slot die 31 on the film circulation side for applying adhesive (not shown).

Therefore, a B-side 32 can be filled with grooves and adhesive, whereas an A-side 33 can remain intact.

Figure 10A:
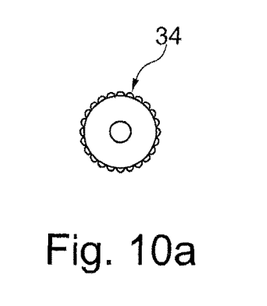
FIG. 10a shows a schematic of grain roller cross-section.
Figure 10B:
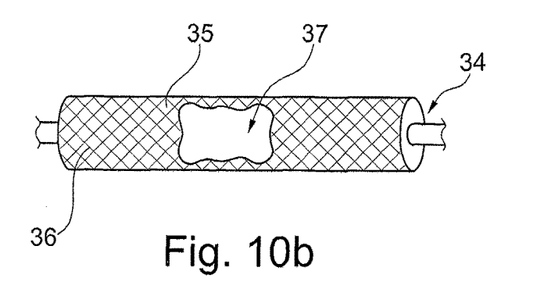
FIG. 10b shows the grain roller from FIG. 10a in schematic perspective view.
Figure 11:
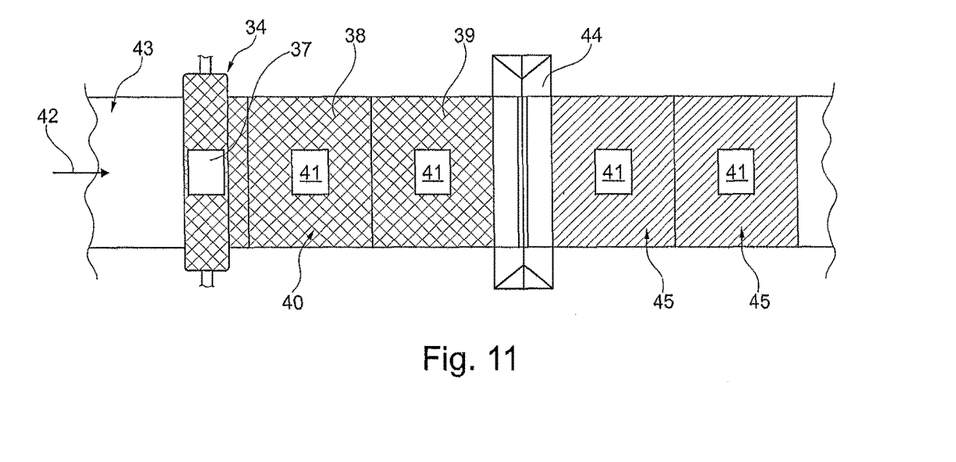
FIG. 11 shows a schematic illustration of plan view of a system using the grain roller from FIGS. 10a and 10b.

The embodiment of the grain roller 34 in FIGS. 10a, 10b and 11 bears a predominant area of grain structure 36 on its cover 35, which is preferably a replica of natural leather.

However, a range of several cm² sizes have a slot, which is not grained. During production, this type of grain roller 34 can thus produce individual copies (labeled), each having a large grained area 40, but also a non-grained area 41 further in a machine direction 42, passing through the laminate film 43, then a station with a slot die 44 in which an adhesive application is carried out.

With this specific embodiment, the adhesive roller areas can be left out. For example, application areas are found in the reduction of waste adhesive. In some door panels, partial film areas are stamped after lamination. If there is no glue in these areas, then the blank stamp can also be easily removed.

It is expressly mentioned that recent tests carried out by the inventor have also shown that it may be advantageous to only provide adhesive to the raised areas of an embossed laminate film, i.e. the non-recessed areas. The recessed plates are then capable of going back up, however this is not required, and the ducts form in any case.

The embossing roller can include, for example, a duct pattern.

Alternatively, it may be conceivable to draw a blade over the grid, thereby the adhesive is applied in the required macroscopic structured form.

FIG. 1 shows the drop structure still available after the heating and cooling process of the adhesive application between the film and the component.

In one preferred embodiment, the adhesive is a reactive or non-reactive thermoplastic hot-melt adhesive, most preferably a hot-melt adhesive based on ethylene vinyl acetates, polyacrylates, copolyamides, copolyesters, copolyethers, polyolefins, polyurethanes and relevant copolymers and/or terpolymers.

In a more preferred embodiment of this invention, the components are interior trim components for vehicles. These types of components consist primarily of materials based on natural fiber reinforced polymer materials, for example: a natural fiber material, such as flax polypropylene material; natural fibers, such as (flax) PUR; or a natural fiber, such as (flax) epoxide resin material, as well as an established injection molding method carrier made of polypropylene (PP), styrene-isoprene-styrene (SIS) copolymer, polycarbonate (PC), thermoplastic polyurethane (TPU), thermoplastic polyolefin (TPO) or polyamide. These materials are widely used in the automotive industry and thus are well known to the specialist.

Figure 2:
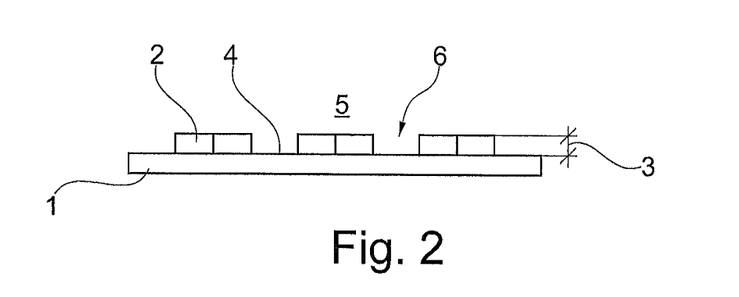
FIG. 2 shows a side view of FIG. 1 in accordance with local type II-II

FIG. 2 shows an example of an adhesive structure after peeling the film back from the component. The light shiny ducts, which have allowed for a smooth removal of the air found between the component and the film, remain completely intact.

Based on components with selected geometry and positioning hole, it was found that an adequate air transfer is guaranteed inside the adhesive grid over distances of more than 10 cm from the nearest hole, as well as critical areas, such as edges and radii.

Furthermore, it has been found that a much lower number of vacuum holes is required than are necessary in current practice. Elongated hold shapes (e.g. slots) have been particularly useful, the length of which exceed the engraving process. This ensures that a hole cannot be sealed by a single dot of adhesive and that there is always contact between a hole and the duct system in the adhesive grid.

Comparative tests with a classic smooth (i.e. non-grid shaped) roller application with the same amount of adhesive on ungrained surfaces show no horizontal air transfer. It is only in areas where the film is practically "unrolled" on the component due to the geometry of said component and the dynamics of the lamination process that no air pockets can be seen. In particular, all surfaces, even with a number of holes from 20% to 80% of the area attributable to air pockets, show a lack of moistening and bonding. Also, comparative tests without adhesive show that there is almost no air transfer. The smooth film seals are directly aimed at the smooth substrate.

Unless otherwise indicated, all parameters were determinations and measurements carried out using customary methods for the specialist in standard methods, i.e. for example, room temperature (21° C.+/−1° C.) and atmospheric pressure (1 atm).

In the following experiments, Jowat AG, Germany (Jowat-Toptherm® 238.30) used a non-reactive polyolefin based hot melt adhesive.

This was on the underside of a TPO film (Benecke-Kaliko/Germany, 2 mm foam mit 0.8 mm top coat) applied by roller application using an engraved roller from the Hardo (Germany) company.

A plate-like component (240 mm diameter, 50 mm depth) made from polyoxymethylene (POM) without grain, with vacuum holes distanced 2 cm in the outer edge area was laminated with the coated film on a single-user vacuum laminating machine from the KIEFEL (Germany) company, whereby the underside of the film was heated to 180° C. and the surface was heated to 140° C., then the film was stretched lengthwise and transversely by 5%. Subsequently, the laminated part was examined for defects caused by air pockets as well as the size of the laminated surface (in order to assess the scope of the air transfer through the ducts of the engraving).

LIST OF REFERENCES USED

1 Laminating film
2 Rhombus
3 Height
4 Surface
5 B-side
6 Duct system
7 Support part
8 Machine direction
9 Protective film
10 Groove
11 Adhesive
12 Surface
13 B-side
14 Radiant heat
15 Droplet
16 Duct system
17 Embossing roller
18 Cover surface
19 Collection
20 Protective film
21 Machine direction
22 Groove
23 Slot die
24 Adhesive
25 Roller route
26 Machine direction
27 Protective film
28 Film storage
29 Embossing roller
30 Pressure roller
31 Spot die
32 B-side
33 A-side
34 Grain roller
35 Cover
36 Grain structure
37 Recess
38 Single use
39 Single use
40 Grained areas
41 Non-grained area
42 Machine direction
43 Protective film
44 Spot die
45 First area

What is claimed is:

1. A method for producing a laminate mold part comprising a vehicle interior panel or a vehicle interior panel part, comprising conducting a preparatory process whereby an adhesive is bonded to a B-side of a laminate film and a support part surface area of a support part by the following steps:
   a. applying the adhesive to the B-side;
   b. subsequently, reforming the adhesive by embossing it in a grid, so that grid ducts are formed before the adhesive is bonded to the surface of the support part; and
   c. producing the laminate mold part.

2. A method for producing a laminate mold part comprising a vehicle interior panel or a vehicle interior panel part, comprising conducting a preparatory process whereby an adhesive is bonded to a B-side of a laminate film and a support part surface area of a support part by the following steps:
  a. introducing indentations into the B-side of the laminate film;
  b. introducing the adhesive into the indentations and/or between the indentations; and
  c. producing the laminate mold part.

3. A method for producing a laminate mold part comprising a vehicle interior panel or a vehicle interior panel part, comprising conducting a preparatory process whereby an adhesive is bonded to a B-side of a laminate film and a support part surface area of a support part by the following steps:
  a. applying the adhesive through a slot die;
  b. whereby emission of the adhesive is prevented by the slot die through local resistance at an outlet, and thereby forming a grid.

4. The method according to claim 1, wherein the adhesive is a hot melt is applied to the laminate film.

5. The method according to claim 4, wherein the hot melt is applied to duct forming structures, so that air from a film surface can be drawn along form ducts between the duct formation surveys.

6. The method in accordance with claim 4 further comprising the following steps:
  a. applying a grid-shaped coating of the adhesive to the B-side of the laminate film and/or onto the surface area of the support part, wherein ducts are formed by the grid-shaped coating of the adhesive;
  b. bringing together the support part and the laminate film so that a layer of the adhesive applied is arranged between the laminate film and the support part; and
  c. connecting the laminate film to the support part by (i) removal of air located between the support part and the laminate film though the ducts by applying a vacuum and/or by (ii) squeezing out the air located between the support part and channels by applying a compacting pressure
wherein
the laminate film is pulled from a roll
and/or
the adhesive is applied around a roller during the circulation of the laminate film
and/or
the adhesive is applied using a slot die on the laminate film
and/or
the adhesive is applied in an internal recess.

7. The method claimed in claim 1, wherein the laminate film is guided around an embossed roller, wherein the surface of the embossed roller has structured protrusions and is arranged so that a duct pattern is adapted for embossing.

8. The method claimed in claim 1, wherein the laminate film is guided around an embossed roller, wherein the surface of the embossed roller has structured protrusions and is arranged so that a number of indentations are impressing into the laminate film.

9. The method claimed in claim 1, wherein the laminate film is guided around a pressure roller and, in one rotation, the pressure roller is guided around to a slot die.

10. The method claimed in claim 1, wherein the adhesive is introduced into macroscopic indentations of the laminate film.

11. The method claimed in claim 1, wherein indentations in an initial laminate film are filled with adhesive and then the indentations are flattened, so that the adhesive raises from the indentations, there-by forming a grid-like structure.

12. The method in accordance with claim 11, wherein to flatten the indentations, the laminate film is actively heated, using lighting with heat lamps.

13. The method in accordance with claim 12, wherein the indentations are flattened in the laminate film through a memory effect in a synthetic material without any external mechanical action.

14. The method in accordance with claim 12, wherein the indentations are flattened in the laminating film through a mechanical action from the A-side.

15. The method in accordance with claim 1, wherein an extended surface of a panel is provided by means of an embossing roll and an area of a panel with a surface structure,
  wherein a recess area is provided in the applying of adhesive.

16. The method in accordance with claim 1, for manufacturing a motor vehicle interior panel part.

17. A method for producing a laminate mold part comprising a vehicle interior panel or a vehicle interior panel part, comprising conducting a preparatory process whereby an adhesive is bonded to a B-side of a laminate film and a support part surface area of a support part by the following steps:
  a. introducing the adhesive into the B-side of the laminate film;
  b. introducing indentations into the B-side of the laminate film; and
  c. producing the laminate mold part.

18. The method according to claim 4, wherein the hot melt is applied to duct forming structures, so that air from a film surface can be drawn along form ducts between duct formation surveys, generating a diamond pattern.

19. The method according to claim 1, wherein the laminate film is guided around a pressure roller to contact an embossing roller and, in one rotation, the pressure roller is guided around to a slot die.

20. The method claimed in claim 1, wherein the adhesive is introduced into laminate film macroscopic indentations level with the surface connected to the B-side of the laminate film or through a surface application above the indentations.

* * * * *